United States Patent [19]

Kastingschafer et al.

[11] Patent Number: 5,462,370
[45] Date of Patent: Oct. 31, 1995

[54] TILTABLE SUPPORTING ROLLER BEARING

[75] Inventors: Gerhard Kastingschafer, Wadersloh; Johannes Auf dem Venne, Ennigerloh; Herbert Pingel, Wadersloh; Reinhard Giesemann, Harsewinkel; Bernhard Peterwerth, Bad Laer; Klaus Gerhardt, Munster; Reinhold Gebbe, Sassenberg, all of Germany

[73] Assignee: Krupp Polysius AG, Beckum, Germany

[21] Appl. No.: 249,750

[22] Filed: May 26, 1994

[30] Foreign Application Priority Data

Jul. 19, 1993 [DE] Germany .......... 43 24 187.5

[51] Int. Cl.⁶ .................................... F16C 19/50
[52] U.S. Cl. ............................. 384/549; 384/558
[58] Field of Search .................... 384/549, 558, 384/581, 584, 548

[56] References Cited

U.S. PATENT DOCUMENTS 4,160,569 7/1979 Reid ............................ 384/549
4,552,508 11/1985 Reid ............................ 384/549

FOREIGN PATENT DOCUMENTS 2736111 2/1978 Germany .
2801588 7/1979 Germany .
3540590 6/1986 Germany .

Primary Examiner—Lenard A. Footland
Attorney, Agent, or Firm—Learman & McCulloch

[57] ABSTRACT

In this tiltable supporting roller bearing according to the invention for supporting a rotary drum there are provided a freely rotatably mounted supporting roller and an appertaining bearing structure which is tiltably supported with respect to a stationary foundation plate with the aid of easily shifted support bearings which are arranged inclined against one another in such a way that the point of rotation of the line of contact between the supporting roller and the riding ring of the rotary drum lies with the vertical central axis of the supporting roller. With a particularly simple and reliable design, this construction makes it possible to compensate for skewing of the rotary drum riding ring and at the same time markedly to reduce or largely avoid undesirable consequences of the axial forces resulting from longitudinal movements of the rotary drum.

10 Claims, 2 Drawing Sheets

TILTABLE SUPPORTING ROLLER BEARING

The invention relates to a tiltable supporting roller bearing for supporting a rotary drum which can be driven in rotation, according to the preamble to claim 1.

Rotary drums of this type are those with a relatively large diameter and with a relatively great length, for example for rotary kilns, rotary coolers, mixing drums or the like. These relatively large rotary drums are constructed with unavoidable inaccuracies of assembly, and they have more or less severe distortions on their casings which are cylindrical per se, which leads to wobbling of their circumferential running surfaces which are generally formed by riding rings fixed on the rotary drum casing. Such wobbling brings with it a poor support between this circumferential running surface (riding ring) and the supporting rollers of the supporting roller bearing which support it. The resulting localised increases in load on the contact surfaces between the supporting rollers and the circumferential running surfaces of the rotary drum lead to damage to the running surfaces.

In order to avoid such damage, various proposals have already been made (e.g. DE-C-27 36 111, DE-A-28 01 588 and DE-C-35 40 590), in which a supporting roller which is mounted so as to be freely rotatable is borne by way of a roller axle on a bearing structure which is supported so that it is tiltable about a point of rotation lying approximately at the height of the supporting roller axle or below it relative to a stationary supporting surface or foundation plate. Skewing of the circumferential running surfaces (e.g. riding ring surfaces) caused by inaccuracies of assembly and distorted rotary drum casings can indeed be compensated for by means of these known tiltable supporting roller bearings by a reaction of the corresponding supporting roller or rollers. However, the angular deviation of the relevant circumferential running surface of the rotary drum relative to the imaginary longitudinal central axis of the rotary drum already causes problems, as a result of which additional longitudinal movements in the direction of this longitudinal central axis occur during each revolution. In fact, these longitudinal movements produce axial forces in the region of the contact surfaces between the outer circumferential surface of the supporting rollers and the circumferential running surface of the rotary drum, the magnitude of these axial forces being determined principally by the vertical bearing pressure and the coefficient of friction. Under the effects of these axial forces, considerable localised increases in load can occur on the outer circumferential points of the supporting rollers and on the circumferential running surfaces of the rotary drum, which can lead to damage to these circumferential or running surfaces.

The object of the invention is to provide a tiltable supporting roller bearing, by means of which with comparatively low expenditure on production and costs skewing of the circumferential running surfaces of the rotary drum (or riding rings) caused by inaccuracies of assembly as well as a distorted rotary drum casing can be compensated and additional longitudinal movements of the rotary drum occurring as a result of the angular deviations of these circumferential running surfaces of the rotary drum are at least reduced to an acceptable minimum.

This object is achieved according to the invention by the features set out.

The tests on which the invention is based have shown that the distance between the line of contact of the outer circumferential surface of the supporting rollers and the circumferential running surface of the rotary kiln on the one hand and the point of rotation of the tiltable supporting roller bearing (supporting roller and its bearing structure) is of particular importance. The aforementioned distance determines a lever arm about the said point of rotation. The greater this lever arm is, the greater will be a moment of rotation acting about this point of rotation, and the greater this moment of rotation is, the greater also will be the load additionally occurring on the said line of contact and thus the load on the supporting roller and the circumferential running surface of the rotary drum (or riding ring).

If in this connection one again considers the known constructions described in the introduction, in which the point of rotation of the tiltable supporting roller bearing lies approximately at the height of the axis of rotation of the supporting roller or markedly below it, then relatively great lever arms are produced there between the said line of contact and the point of rotation, which leads to relatively great moments of rotation and thus to a considerable danger of localised increases in load and the associated damage to the surfaces which are in contact with one another.

In the supporting roller bearing according to the invention the bearing elements are constructed as resilient support bearings which are easily shifted in their cross direction, and in each case in the region below the two pivot bearings these support bearings are inclined towards one another between the bearing structure and the foundation plate (soleplate) in such a way that central axes passing vertically through it intersect in the region of the point of intersection which is determined by the vertical central axis of the supporting roller and the line of contact between the outer circumferential surface of the supporting roller and the circumferential running surface of the rotary kiln. This previously defined point of intersection forms a point of application of force in which all essential forces which occur, namely the vertical dead weight of the rotary drum and the horizontal force resulting from an axial shift of the rotary drum and from friction are applied.

By means of this support according to the invention with the aid of the resilient support bearing which is easily shifted in its cross direction, the aforementioned point of rotation of this supporting roller bearing is placed quite close to the said point of intersection or directly in this point of intersection, so that here, by contrast with the described known constructions, the lever arm between the point of rotation and the intersection (point of application of force) is quite small or even zero, so that accordingly a moment of rotation resulting therefrom in the event of angular deviations of the circumferential running surface or riding ring of the rotary drum is reduced to a minimum or does not occur at all, which in turn leads to localised increases of load which are insignificantly small or even non-existent.

As will also be seen from the description of the embodiments, this advantageous construction can be achieved with comparatively particularly low expenditure on production and costs.

The invention will be explained in greater detail below with the aid of the drawings, in which:

Figure 1:
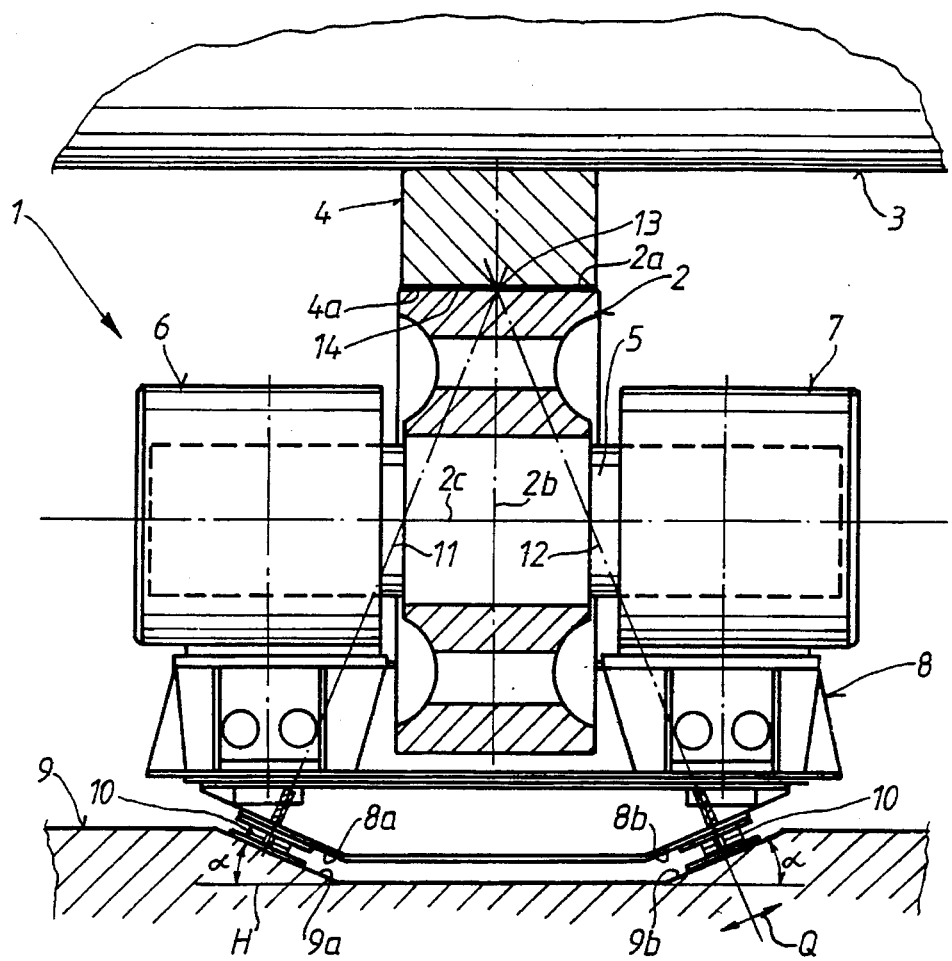
FIG. 1 shows a partially cut-away longitudinal view of a supporting roller bearing according to the invention.

The tiltable supporting roller bearing 1 shown in FIG. 1 contains a supporting roller 2 which is mounted so as to be freely rotatable and forms a kind of self-adjusting roller support for a longitudinal section, which is associated therewith or to be supported, of a rotary drum 3 which is only indicated and which can for example be part of a rotary kiln or another arrangement of similarly large dimensions. The rotary drum 3 is supported with a corresponding circumferential running surface so that it rolls on the outer circumferential surface (bearing surface) 2a of this supporting roller 2, and this circumferential running surface can be constructed directly on the cylindrical casing of this rotary drum 3, but preferably—as is known per se—can be formed by a riding ring 4, or the circumferential running surface 4a thereof, attached to the rotary drum casing. The rotary drum 3 can be driven in rotation in the usual way.

The supporting roller 2 is attached to a roller axle 5 which is mounted or supported by the two ends of this roller axle 5 so as to be freely rotatable in two pivot bearings 6, 7 which can be formed in the usual way by antifriction bearings or plain bearings.

By way of its roller axle 5 and its pivot bearings 6, 7 the supporting roller 2 is borne by a bearing structure 8 which can be formed by a supporting structure like a profiled frame. This bearing structure 8 is in turn tiltably supported by way of bearing elements on a stationary sole-plate or foundation plate 9 which is constructed and set up as a separate foundation plate or can also be set into an installation foundation in a suitable manner.

The aforementioned bearing elements are constructed as resilient support bearings 10 which are easily shifted in their cross direction (cf. for example double arrow Q in FIG. 1), each of these support bearings 10 being disposed in the region below one of the two pivot bearings 6, 7 respectively. It is particularly important here that these two support bearings 10 are disposed and aligned in the manner shown in FIG. 1 so that they are inclined towards one another between the bearing structure 8 and the foundation plate 9 in such a way that central axes 11, 12 passing vertically therethrough intersect in the region of the point of intersection 13 of the vertical central axis 2b of the supporting roller and the line of contact 14 at which the outer circumferential surface 2a of the supporting roller 2 and the circumferential running surface 4a of the riding ring 4 touch. In this case in the basic position of the supporting roller bearing 1 the support bearings 10 are inclined towards one another at the same angle α with respect to the horizontal H.

In order to achieve the inclination of the two support bearings 10 towards one another as described above, the bearing structure 8 and the foundation plate 9 each have in their regions below the two pivot bearings 6, 7 two opposing abutment surfaces 8a, 9a and 8b, 9b respectively which run parallel to one another and between which an associated support bearing 10 is arranged in each case, the imaginary central lines of these abutment surfaces running perpendicular to the support bearings coinciding with the intersecting central axes 11, 12 of the support bearings 10, as can be seen in FIG. 1.

The support bearings 10 can be constructed at least partially in the form of resilient support bearing sets. A particularly advantageous and preferred construction of these support bearings 10 is produced in that they are constructed as elastomeric support bearings and thus on the one hand they are easy to shift and resilient in the desired cross direction (double arrow Q) and on the other hand are additionally resilient in the direction of their central axes 11, 12.

The point of intersection formed by the chosen inclination (angle α) and thus by its intersecting central axes 11, 12 (which point of intersection actually lies in the immediate vicinity of the point of intersection 13 between the vertical central axis 2b of the supporting roller and the line of contact 14 of the outer circumferential surface 2a of the supporting roller and the circumferential running surface 4a of the rotary drum or lies directly therein) simultaneously forms a so-called centre of rotation which is formed by a shearing deformation of the easily shifted support bearing 10 when an edge support occurs of the elements rolling on one another (supporting roller 2 and rotary drum 3) and/or the bearing structure 8 which yields to horizontal forces.

By means of this tiltable support, which is extremely secure and reliable in its operation, of the bearing structure 8 together with the supporting roller 2 and accessories borne by it, on the one hand skewing of the riding ring 4 or the circumferential surface thereof 4a is effectively compensated by the reaction of the supporting roller 2, and on the other hand any additional longitudinal movements (axial movements) of the rotary drum 3 occurring during the rotary movement as a result of angular deviations of the riding ring 4 relative to the longitudinal axis of the rotary drum are also compensated in an advantageous manner, since only an extremely small lever arm or no lever arm at all is present between the point of rotation of the supporting roller bearing 1 and the point of application of force occurring in the point of intersection 13 between the line of contact 14 and the vertical central axis 2b of the supporting roller, so that accordingly insignificantly small moments of rotation or no moments of rotation can occur between these regions which could be produced by axial forces during longitudinal movements or angular deviations of the rotary drum 3 with the riding ring 4.

Figure 2:
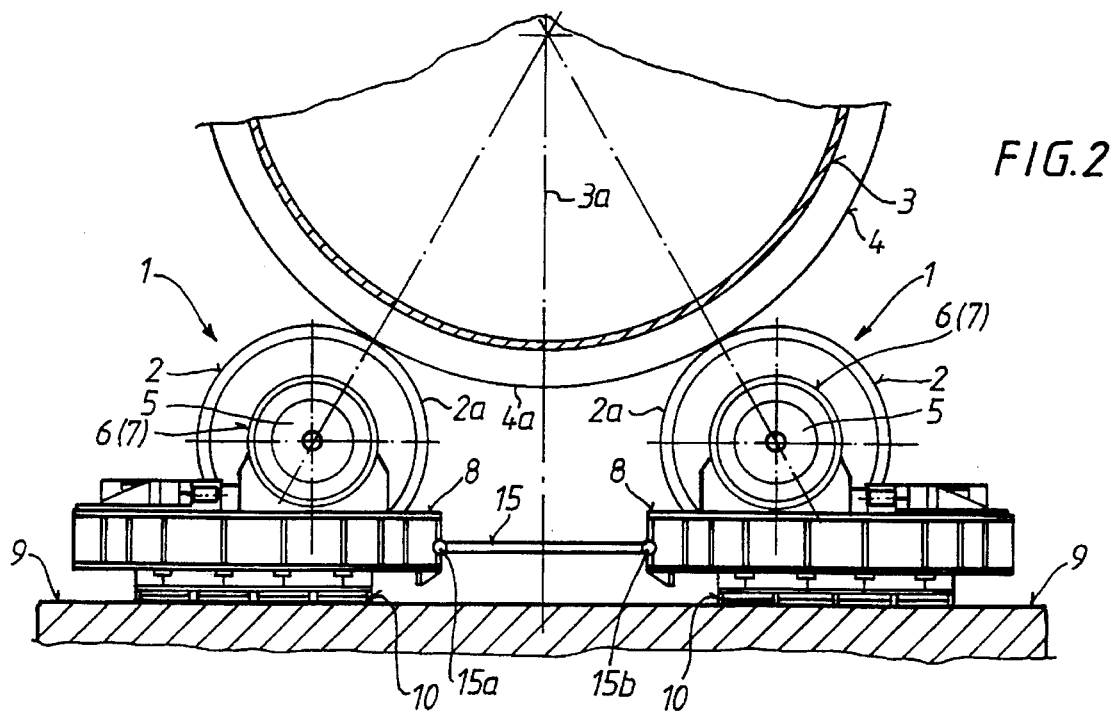
FIG. 2 shows a simplified transverse view of a first embodiment of an assembly of two supporting roller bearings to form a supporting roller set, arranged below the rotary drum for example of a rotary kiln.

FIG. 2 shows a first example for the assembly of two supporting roller bearings 1 which are similarly constructed according to the invention to form a supporting roller set for supporting a corresponding longitudinal section of the rotary drum 3 by way of the corresponding riding ring 4.

In this case the two tiltable supporting roller bearings 1 are arranged symmetrically on both sides of the vertical longitudinal central plane 3a of the rotary drum 3 and cooperate with the same circumferential running surface or the same riding ring 4. Each of these two supporting roller sets 1 is constructed according to the explanation given above in relation to FIG. 1. Accordingly each supporting roller 2 is also tiltably supported on an appertaining foundation plate 9 by way of its roller axle 5, the pivot bearings 6, 7 and the appertaining bearing structure 8 by means of the easily shifted support bearings 10 which are arranged inclined towards one another.

However, in this paired arrangement of two supporting roller bearings 1 it is important that the two bearing structures 8 are connected to one another by at least one spacer element 15 by means of which a constant spacing is maintained between these two bearing structures 8 and thus in particular between the two supporting rollers 2 borne thereby and that expansion forces which occur are taken up by the vertical dead weight of the two supporting rollers 2 emanating from the rotary drum 3. So that the independent tiltability of each supporting roller bearing 1 is ensured here, the spacer element 15 advantageously has connecting joints 15a, 15b at its points of connection to the bearing structures 8.

Figure 3:
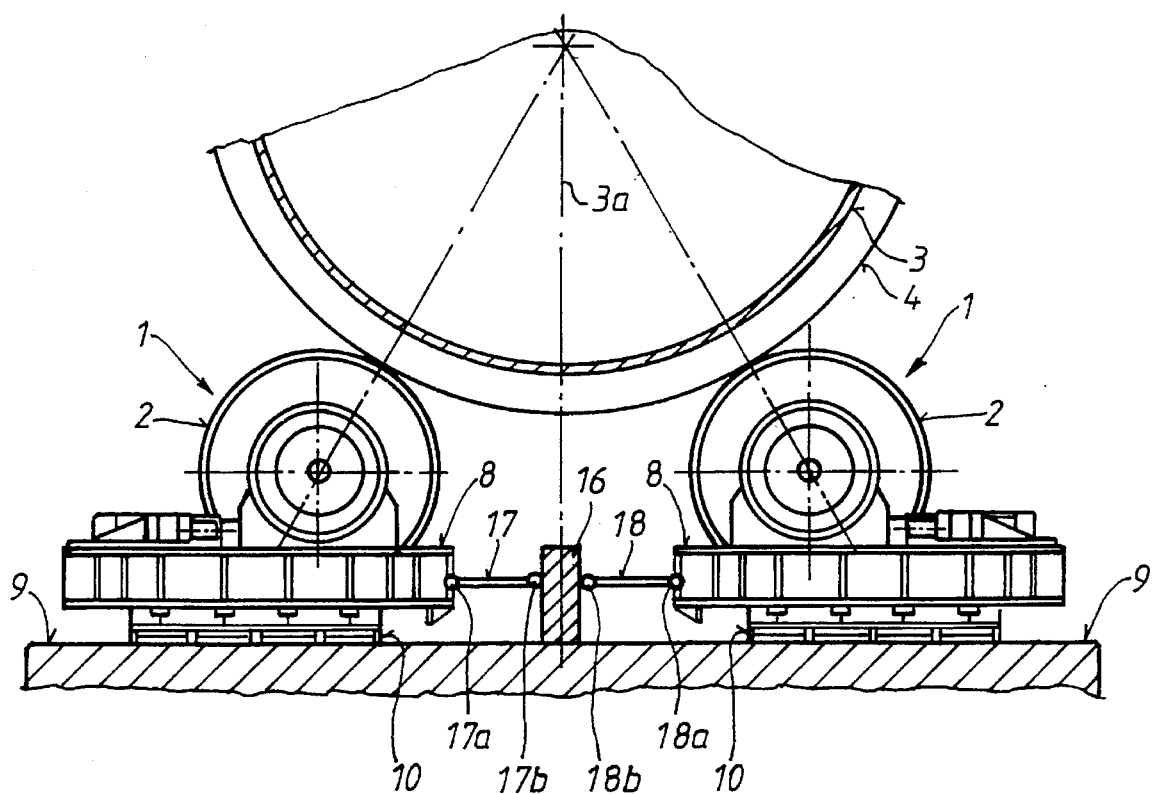
FIG. 3 shows a similar transverse view to that of FIG. 2, but in order to explain another possible construction for the connection between the two supporting rollers combined into a supporting roller set.

If a continuous (single-part) spacer element 15 according to the preceding embodiment (FIG. 2) is used, the possibility cannot be entirely excluded that the two bearing structures 8, which each support and bear a supporting roller 2, could affect each other unfavourably in the event of unfavourable installation or operating conditions of a supporting roller set in co-operation with the rotary drum to be supported. In order to eliminate this completely, but in so doing to be able to retain the advantages of a substantially constant spacing from one another, the further embodiment shown in FIG. 3 is provided for the assembly of two supporting roller bearings 1 to form one supporting roller set. A substantial difference between this further embodiment according to FIG. 3 and the embodiment described above in relation to FIG. 2 may be seen in the fact that in the region between the two bearing structures 8, which may be of similar construction in each case as described in connection with FIG. 1, on the one hand a fixed or stationary support element 16 is arranged and on the other hand these two bearing structures 8 are connected to one another by two spacer elements 17 and 8 in such a way that each spacer element 17, 18 is flexibly connected at one end by way of a connecting joint 17a or 18a respectively to one of the two bearing structures 8 and at its other, opposite end by way of a connecting joint 17b or 18b respectively to the stationary support element 16. For reasons of similar deflectability and a similar design it will generally be advantageous to construct the two spacer elements 17 and 18 of substantially equal length—when viewed in the cross direction with respect to the appertaining rotary drum 3— and accordingly to arrange the stationary support element 16 immovably approximately on the vertical longitudinal central plane 3a of the rotary drum 3 to be supported, preferably on the or an appertaining foundation plate 9. In this way the two supporting roller bearings 1 belonging to one supporting roller set are connected to one another not directly but indirectly by way of the support element 16 in order to maintain the same spacing; by comparison with the previously described embodiment according to FIG. 2, in this further possible construction according to FIG. 3 there is to some extent a division of the spacer element 15 into two spacer element parts of equal length. Otherwise, however, all the other parts of each supporting roller bearing belonging to this supporting roller set according to FIG. 3 can be constructed as described above particularly with regard to FIG. 1, in which case in particular the resilient support bearings 10 which are easily shifted in their cross direction are arranged in the manner described in relation to FIG. 1 between the bearing structure 8 and the appertaining foundation plate 9.

With regard to the general construction of the support bearings 10 it may also be mentioned that—as can be seen particularly in FIG. 2—each support bearing 10 is constructed in the form of at least one relatively flat strip or in the form of easily shifted support bearing elements assembled in a row, wherein each strip or each row of support bearing elements is aligned at right angles (perpendicular) to the longitudinal roller axis 2c. The overall length of one such support bearing strip or one such row of support bearing elements advantageously depends upon the particular construction and arrangement of the entire supporting roller bearing 1 or the supporting roller set formed thereby.

We claim:

1. Tiltable supporting roller bearing for supporting a rotary drum (3) which is driven in rotation, comprising a) supporting roller (2) which is supported with its roller axle (5) so as to be freely rotatable in two pivot bearings (6, 7 and has a circumferential running surface (4a) of the rotary drum (3) mounted on its outer circumferential surface (2a), b) a bearing structure (8) on which the pivot bearings (6, 7) are arranged and which is tiltably supported by way of bearing elements (10) on a stationary foundation plate (9), characterised in that c) the bearing elements are constructed as resilient support bearings (10) which are easily shifted in their cross direction, and in each case in the region below the two pivot bearings (6, 7) these support bearings are inclined towards one another between the bearing structure (8) and the foundation plate (9) in such a way that central axes (11, 12) passing vertically through it intersect in the region of the point of intersection (13) between the vertical central axis (2b) of the supporting roller and the line of contact (14) between the outer circumferential surface (2a) of the supporting roller and the circumferential running surface (4a) of the rotary kiln.

2. Supporting roller bearing as claimed in claim 1, characterised in that the support bearings (10) are at least partially constructed in the form of resilient support bearing sets.

3. Supporting roller bearing as claimed in claim 1, characterised in that the support bearings (10) are constructed as elastomeric support bearings.

4. Supporting roller bearing as claimed in claim 1, characterised in that each support bearing (10) is constructed in the form of at least one relatively flat strip or in the form of support bearing elements assembled in a row, wherein each strip or each row of support bearing elements is aligned at right angles to the longitudinal roller axis (2c).

5. Supporting roller bearing as claimed in claim 1, characterised in that in the basic position the support bearings (10) are inclined towards one another at the same angle ($\alpha$) with respect to the horizontal (H).

6. Supporting roller bearing as claimed in claim 5, characterised in that the bearing structure (8) and the foundation plate (9) each have in their regions below the two pivot bearings (6, 7) two opposing abutment surfaces (8a, 9a and 8b, 9b respectively) which run parallel to one another and between which an associated support bearing (10) is arranged in each case, the imaginary central lines of these abutment surfaces running perpendicular thereto coinciding with the intersecting central axes (11, 12) of the support bearings (10).

7. Supporting roller bearing as claimed in claim 6, characterised in that at least the bearing structure (8) is constructed like a profiled frame.

8. Supporting roller bearing as claimed in claim 1, in which two supporting rollers (2) with their bearing structure (8) are combined to form a supporting roller set, are arranged symmetrically on both sides of the vertical longitudinal central plane (3a) of the rotary drum (3) to be supported and co-operate with the same circumferential running surface (4, 4a) of this rotary drum, characterised in that the two bearing structures (8) are connected to one another by at least one spacer element (15, 17, 18) in order to maintain a constant spacing.

9. Supporting roller bearing as claimed in claim 8, characterised in that the spacer element (15) advantageously has connecting joints (15a, 15b) at its points of connection to the bearing structures (8).

10. Supporting roller bearing as claimed in claim 8, characterised in that in the region between the two bearing structures (8) on the one hand a stationary support element (16) is arranged—preferably approximately on the vertical longitudinal central plane (3*a*) of the rotary drum (3) to be supported—and on the other hand these two bearing structures (8) are connected to one another by two spacer elements (17, 18) in such a way that each spacer element is flexibly connected at one end to one of the two bearing structures (8) and at its other, opposite end to the stationary support element (16).

* * * * *